(12) United States Patent
Habert et al.

(10) Patent No.: US 8,428,835 B2
(45) Date of Patent: Apr. 23, 2013

(54) METHOD FOR CONTROLLING THE OPERATION OF A POWER UNIT GROUP

(75) Inventors: Patrice Habert, Cerny (FR); Eric Vigerie, Voisins le Bretonneux (FR)

(73) Assignee: Renault S.A.S., Boulogne Billancourt (FR)

( * ) Notice: Subject to any disclaimer, the term of this patent is extended or adjusted under 35 U.S.C. 154(b) by 738 days.

(21) Appl. No.: 12/524,366

(22) PCT Filed: Jan. 9, 2008

(86) PCT No.: PCT/FR2008/050033
§ 371 (c)(1),
(2), (4) Date: Jan. 14, 2010

(87) PCT Pub. No.: WO2008/107581
PCT Pub. Date: Sep. 12, 2008

(65) Prior Publication Data
US 2010/0138119 A1  Jun. 3, 2010

(30) Foreign Application Priority Data
Jan. 24, 2007 (FR) .................................... 07 00475

(51) Int. Cl.
*G06F 17/00* (2006.01)
*G06F 7/00* (2006.01)
(52) U.S. Cl.
USPC ............... 701/54; 477/43; 477/57; 477/174; 60/602
(58) Field of Classification Search .................. None
See application file for complete search history.

(56) References Cited

U.S. PATENT DOCUMENTS

| 4,735,114 | A | * | 4/1988 | Satoh et al. ..................... 477/43 |
| 6,089,018 | A | * | 7/2000 | Bischoff et al. ................ 60/602 |
| 2003/0055551 | A1 | | 3/2003 | Weber et al. |
| 2005/0014605 | A1 | | 1/2005 | Ries-Mueller |
| 2007/0135263 | A1 | | 6/2007 | Dobele et al. |

FOREIGN PATENT DOCUMENTS

| DE | 10 2004 009 233 | 9/2005 |
| EP | 0 189 050 | 7/1986 |
| FR | 2 771 137 | 5/1999 |
| FR | 2 809 059 | 11/2001 |
| FR | 2 851 629 | 8/2004 |
| WO | 03 039903 | 5/2003 |
| WO | 2007 057194 | 5/2007 |

* cited by examiner

*Primary Examiner* — Luna Champagne
(74) *Attorney, Agent, or Firm* — Oblon, Spivak, McClelland, Maier & Neustadt, L.L.P.

(57) ABSTRACT

A method for controlling operation of a power unit group of a vehicle including at least one driving engine, a manual gearbox with plural gears and a clutch, in which a control system with a computer determines the target power to be supplied by the power unit group depending on information corresponding to an intention of the driver and displayed on an input of the computer. During a gear change, the information on the driver's intention is frozen during the clutch opening time so that the control system does not take into account a potential disturbing information, such as a quick foot release, displayed on the input between the clutch opening moment and the clutch closing moment to determine the target power to be supplied. The method can be applied particular to a manual gearbox having a system for displaying the recommended gear ratio on the dashboard.

8 Claims, 2 Drawing Sheets

METHOD FOR CONTROLLING THE OPERATION OF A POWER UNIT GROUP

The invention relates to a method of controlling the operation of a vehicle powertrain having a manually controlled gearbox.

In a general manner, a vehicle powertrain comprises a driving engine, a clutch and a manually or automatically controlled multi-speed gearbox.

In the case of an automatically controlled gearbox, the change of gear ratio is governed by a control system which determines the gear ratio to be engaged as a function of the speed of the vehicle, the engine speed and the load applied to said engine and while taking account of the intention of the driver expressed, for example, by the position of the acceleration pedal, which corresponds to a power target setpoint.

It is known that the reduction ratio of the gearbox must allow the engine to rotate at an optimum speed taking account of the speed of rotation of the wheels, that is to say of the forward travel speed of the vehicle and of the demanded torque, while maintaining a power reserve enabling the driver to face various driving conditions, for example uphill driving, downhill driving with engine braking, overtaking maneuvers or sudden braking, etc.

It is thus possible to define, as a function of the type of engine, various rules relating to gearshifts, either toward a higher gear ratio or toward a lower gear ratio.

Such shift rules are represented, by way of example, in FIG. 1, which is a diagram indicating, for a demanded power, expressed by the position of the accelerator indicated as ordinate, the speed of the vehicle, indicated as abscissa, starting from which there is a need to change gear ratio.

For example, starting from a point $A_1$ for which the third gear is engaged and which corresponds to a speed $V_1$ of the vehicle, the depression $P_1$ of the accelerator pedal brings about a progressive rise in speed of the vehicle with, for a constant position of the pedal, a shift into fourth at the point $A_2$ at the speed $V_2$ and then into fifth at the point $A_3$ at the speed $V_3$.

If the vehicle slows down, for example on a slope, without action on the accelerator pedal, it is necessary to shift back from fifth into fourth at the point $A_4$ at the speed $V_4$ and then from fourth into third at the point $A_5$ at the speed $V_5$.

Likewise, starting from a point B corresponding to a speed V' of the vehicle and to a position P' of the accelerator pedal, in order to maintain this speed V', for example on a slope, while increasing the demanded torque, it is necessary to depress the accelerator pedal and downshift from fourth into third at the point B'.

In the diagram, the curves shown in solid lines 11 and 12 respectively correspond to the shift from third into fourth and from fourth into fifth and the curves shown in broken lines 13 and 14 respectively correspond to the shift from fifth into fourth and from fourth into third.

Such shift rules can be programmed into the control system of an automatic clutch in order to control the change of gear ratio on the basis of information relating to the intention of the driver expressed by the position of the acceleration pedal.

In a vehicle with a manually controlled gearbox, the driver himself assesses the moment to upshift or downshift, for example by monitoring the noise of his engine or by making use, where appropriate, of a revolution counter in order to choose the optimum reduction ratio corresponding to an acceptable compromise between various demands, i.e. noise, acceleration, fuel consumption.

However, it has been apparent for some time that the operation of a vehicle powertrain should be controlled in a more precise manner and for other reasons, in particular in order to reduce the consumption of fuel or the pollution caused by the emission of harmful compounds. Moreover, the regulations are becoming more demanding in this respect.

However, such demands are also being imposed on vehicles with a manual gearbox in which the operation of the powertrain must therefore also be controlled in a more precise manner than was previously the case. For that purpose, the vehicle may advantageously be equipped with means to assist driving that make it possible to recommend a change of gear ratio to the driver or to check if the engaged gear ratio is suited to the engine speed, to the speed of the vehicle and to the demanded power. A simple revolution counter is in that case insufficient and it becomes preferable, even in a manual gearbox vehicle, to have available a control system with a computer giving the necessary indications to the driver.

Such control systems have already been available to heavy goods vehicles for a long time, in particular in order to reduce fuel consumption.

Document FR-A-2 431 737, for example, describes a device of this type comprising a computer which takes account, for example, of the instantaneous values of the engine speed, of the vehicle speed and of the load, which are measured by sensors, in order to visually or audibly display indications relating to fuel consumption and, where applicable, the need to change the gearbox ratio up or down.

In particular, a luminous panel on which various curves of equal fuel consumption are indicated may physically represent the torque/speed diagram so as to allow the driver to check, at each instant, if he is within an optimum consumption range.

These indications are provided by a computer as a function of the torque demanded of the engine by the driver which can be expressed, for example, by the position of the acceleration pedal.

Other sensors may indicate, for example, the flow rate and the pressure of the injected fuel, the air intake pressure into the engine, the pressure in the combustion chambers of the cylinders, the temperature of the exhaust gases, etc., in order to monitor various operating parameters which may vary according to the engine type.

However, such control systems which operate as a function of the intention of the driver can also be used to control a slow actuator, in the case of a turbocharged engine, so as to achieve a torque target setpoint.

Therefore, the invention relates, in a general manner, to a control system determining a target power to be provided by the powertrain as a function of information corresponding to the intention of the driver and being expressed, customarily, by the position of the acceleration pedal.

It is apparent, however, that simply taking into account this pedal position could, in the case of a manual control, result in an untimely operation not corresponding to the actual intention of the driver.

For example, the diagram in FIG. 1 shows that, for a position $P_1$ of the acceleration pedal, the control system recommends a shift into 4th when the speed of the vehicle arrives at the point $A_2$. In the case of a manual control of the gearbox, the driver who sees the recommended 4th gear ratio displayed on his dashboard releases his foot from the accelerator after a short reaction time, for example at the point C, in order to shift into 4th. With the speed V remaining substantially constant, the control system, which only takes account of the information constituted by the depression of the acceleration pedal, will therefore recommend a shift into 5th at the line 12 of the diagram, and this false indication may disturb the driver by recommending an undesirable gear ratio to him.

Likewise, in a turbocharged engine using a slow actuator controlled by a slow setpoint based on the torque target setpoint, this setpoint falls during a change of gear ratio at the moment when the driver releases his foot from the accelerator, and this will induce a delay in actuating the turbo when the driver again demands a torque setpoint.

The invention relates to a new method whereby the intention-related information displayed at the input of the computer can be formatted so as to avoid such disadvantages.

According to the invention, during a change of gear ratio, the information relating to the intention of the driver is frozen during the clutch opening time, such that the control system cannot take account, should the case arise, of disturbing information displayed on the computer between the clutch opening instant and the clutch closing instant in order to determine the target power to be provided.

In a particularly advantageous manner, the intention-related information expressed at each instant, by the driver, is delayed and the computer simultaneously receives immediate information expressed, at this instant, by the driver and delayed preceding information and, after comparison, takes account only of the information corresponding to an increase in the target power.

In a preferred embodiment, the computer of the control system detects, at each instant, the open or closed state of the clutch and, at the instant of detecting the opening of the clutch, the intention-related information delayed until this instant is frozen until the closing instant, the delayed information thus maintained at a constant value being permanently compared with the value of the immediate intention-related information displayed at each instant, so as to take account only of the larger of the two values in order to determine the target power.

Advantageously, the delay time imposed on the information relating to the intention of the driver is at least equal to the time necessary for detecting the open state of the clutch, and may be, for example, a few tenths of a second, preferably around 300 milliseconds.

In the case where the information relating to the intention of the driver is a signal corresponding to the position of the accelerator pedal of the vehicle, the control system does not take account of disturbing information resulting from a quick foot release from the pedal.

In the case where the information relating to the intention of the driver is a target power setpoint serving to control a slow actuator for a turbocharged engine, the control system does not take account, for the control of the actuator, of a fall in the target setpoint resulting from a quick foot release from the accelerator pedal for the gear change.

Other advantageous features of the invention will become apparent from the description which follows of a specific embodiment, given by way of example, with reference to the appended drawings.

Figure 1:
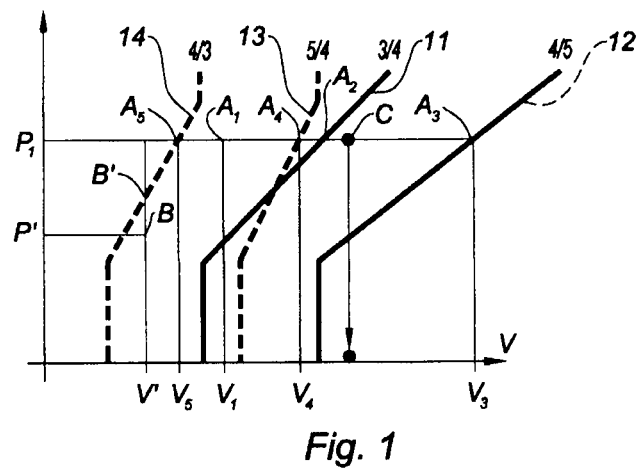
FIG. 1 is a torque/speed diagram indicating an example of rules relating to gearshifts in the upshift direction and the downshift direction.

As indicated above, FIG. 1 is a diagram of known type indicating, for a demanded torque expressed by the position of the accelerator indicated as ordinate, the speed of the vehicle, indicated as abscissa, starting from which there is a need to change gear ratio, according to shift rules indicated by a continuous line for the upshift ratios and by a broken line for the downshift ratios.

Figure 3:
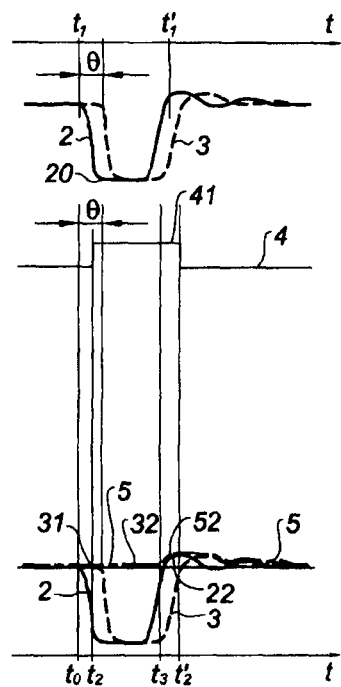
FIG. 3 shows the change, according to the steps of the method, in the information signal relating to the intention of the driver.

FIG. 3 shows, with regard to each step of the method, the change over time in the information signal indicated as ordinate and corresponding to the position of the accelerator pedal.

The curve 2 represents a quick foot release corresponding to a low plateau 20 between two successive instants $t_1$, $t'_1$.

According to the first step A of the method, the raw information signal represented by the curve 2 in FIG. 3 is delayed, at each instant, by a time θ which is at least equal to the time necessary for detecting the open or closed state of the clutch and may be, for example, 300 milliseconds. This delayed signal is represented in FIG. 3 by the broken-line curve 3.

In the second step B of the method, the open state of the clutch is detected by a sensor (software sensor or physical sensor) which transmits a signal represented by the line 4 to the computer.

Figure 2:
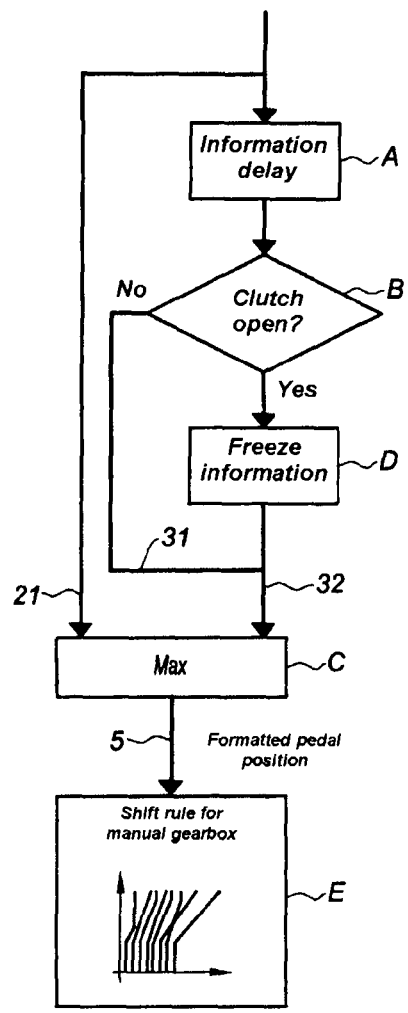
FIG. 2 is a schematic diagram of the formatting, according to the invention, of information relating to the intention of the driver.

As is shown in FIG. 2, as long as the clutch is closed, the computer of the control system simultaneously receives, at each instant, two signals which are displayed on a comparator C, respectively a signal 21 corresponding to the raw information expressed, at this instant, by the driver and a signal corresponding to preceding information delayed by the time θ, in the manner indicated in FIG. 3, with regard to the step A.

In step B, a computing block of the control system checks the state of the clutch. The line 4 in FIG. 3 thus contains a high plateau 41 between the clutch opening instant $t_2$ and the closing instant $t'_2$.

As is shown by the curve 2, which indicates the variation in the information signal displayed, at each instant, on the comparator C, the instant $t_2$ of detecting the open state of the clutch is slightly offset with respect to the instant $t_0$ at which the driver releases his foot from the accelerator.

However, the signal 21 has been delayed by a time θ at least equal to the detection time $t_0$, $t_2$. Therefore, the delayed signal 31, the variation of which is represented by the curve 3 in FIG. 3, again corresponds to a depressed position of the acceleration pedal at the instant $t_2$ of detecting the opening of the clutch.

According to the invention, in this step D, this information 3 is frozen and the value 32 of the signal displayed on the comparator is therefore maintained constant from the instant $t_2$ and until the instant $t'_2$ of closing the clutch.

The comparator C therefore permanently receives an immediate signal 21 corresponding to the instantaneous position of the acceleration pedal and the delayed signal maintained at its frozen value 32, and it displays on the computer E a formatted position signal 5 corresponding to the larger of the two values 21 and 32.

In this way, as is shown by the curve 5 indicated in chain line in FIG. 3, when the driver releases his foot from the accelerator for declutching, the intention-related information 5 displayed on the computer E is not modified and is maintained at the value that it had at the instant $t_0$.

However, if the driver demands extra power at the moment of engaging the clutch, which is manifested by a depression 22 of the pedal, it is this higher value 52 which is displayed, from the instant $t_3$, on the computer E.

Thus, the computer takes account, at each instant, of the intention-related information corresponding to the desired maximum power and does not risk recommending a premature gear ratio upshift which would result in an untimely loss of power.

The invention thus makes it possible to display on the dashboard a recommended gear ratio that takes account of the actual driving conditions at each instant.

However, the invention can also apply to the determination of an optimum target power setpoint for the control of a slow actuator in a turbocharged engine.

Figure 4:
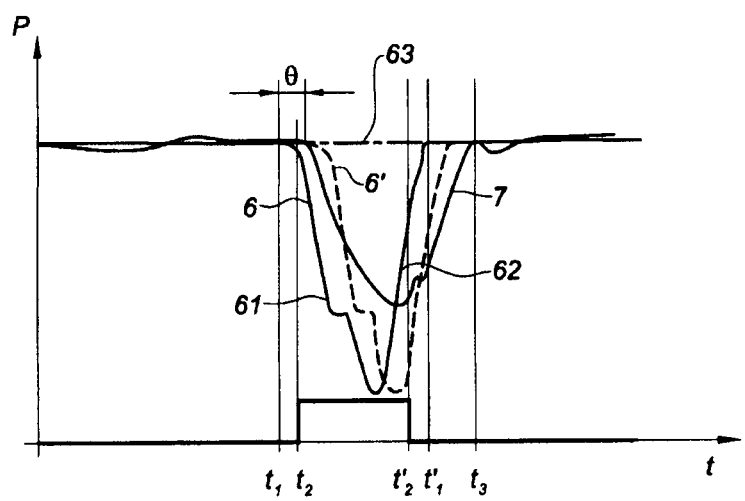
FIG. 4 is a pressure/time diagram indicating the change in the pressure setpoint for an engine with a turbocharger.

FIG. 4 is a pressure/time diagram illustrating an example of applying the invention to the case of such an engine in which the boost pressure is controlled by a slow actuator controlled by a turbo pressure setpoint associated with the intention of the driver and expressed, for example, by the position of the acceleration pedal.

The information relating to the intention of the driver is therefore manifested by a setpoint signal displayed on the computer. In FIG. 4, the curve 6 indicates the variation over time in this setpoint signal during a change of gear ratio which involves a foot release from the accelerator from the instant $t_1$ and a declutching which is detected with a slight delay time.

The foot release determines a fall in the pressure setpoint represented by the part 61 of the curve 6, between the instant $t_1$ and the instant $t'_1$. This results in a reduction in the actual boost pressure, of which the variation is represented by the curve 7 and which determines the air mass admitted into the combustion chamber.

At the moment of engaging the clutch, the driver again demands some power and the pressure setpoint increases once more according to the part 62 of the curve 6, but the actual boost pressure is achieved only at the instant $t_3$, with a delay $t'_1 \, t_3$ due to the dynamics of the system.

Since the maximum torque which can be achieved is proportional to the admitted air mass, the driver's demand for power can be limited provisionally until the boost pressure represented by the curve 7 is established at the setpoint value represented by the curve 6, at the instant $t_3$.

According to the invention, the information signal relating to the intention of the driver is delayed by a time θ at least equal to the time necessary for detecting the state of the clutch and of which the variation is represented, in FIG. 4, by the curve 6', which is therefore offset toward the right, by the value θ, with respect to the curve 6.

The steps of the method are the same as above and are schematically indicated in FIG. 2.

As indicated in step B, at the instant $t_2$ of detecting the open state of the clutch, the delayed information 6' is frozen and maintained at a constant value, according to the line 63 indicated in chain line. This frozen value 63 is compared with the instantaneous value of the information signal 6, so as to display the larger value on the computer. Thus, at the instant $t'_2$ of closing the clutch, the computer will immediately demand some power in order to obtain the desired boost pressure. The pressure commanded by the slow actuator is thus prevented from falling at the moment when the foot is released to change gear ratio.

Of course, the invention is not limited to the details of the embodiment which has been set out by way of simple example and may, in particular, apply to any type of engine and gearbox.

The invention claimed is:

1. A method of controlling operation of a vehicle powertrain, including a driving engine, a multi-speed manual gearbox and a clutch, the method comprising:
   determining, via a control system with a computer, a target power to be provided by the powertrain as a function of information displayed on a display screen of the computer corresponding to an intention of a driver,
   wherein the information relating to the intention of the driver is maintained on the display screen in response to a release of the vehicle accelerator for declutching during a change of gear ratio, such that the control system does not display and process inaccurate information obtained between a clutch opening instant and a clutch closing instant, when determining the target power to be provided.

2. The control method as claimed in claim 1, wherein the intention-related information expressed at each instant by the driver is delayed and the computer of the control system simultaneously receives, at each instant, intention related information expressed at that instant by the driver and delayed preceding information and, after comparison, processes only information corresponding to an increase in the target power.

3. The control method as claimed in claim 2, wherein
   the computer of the control system detects, at each instant, an open or closed state of the clutch, wherein at the instant of detecting the opening of the clutch, the intention related information delayed until this instant is maintained until the closing instant, and the delayed information thus maintained at a constant value is compared with the value of the immediate intention-related information displayed at each instant, and
   the control system processes only the larger of the two values to determine the target power.

4. The control method as claimed in claim 3, wherein the delay time imposed on the information relating to the intention of the driver is at least equal to the time necessary for detecting the open state of the clutch.

5. The control method as claimed in claim 1, wherein the information relating to the intention of the driver is a signal corresponding to a position of the accelerator of the vehicle, and the control system does not process inaccurate information resulting from a quick foot release from the accelerator.

6. The control method as claimed in claim 1, wherein the information relating to the intention of the driver is a target power setpoint serving to control a slow actuator for a turbocharged engine, and the control system does not process, for control of the actuator, a fall in the target power setpoint resulting from a quick foot release from an acceleration for a gear change.

7. The control method as claimed in claim 6, wherein
   an information signal corresponding to the target power setpoint is displayed at each instant on the computer of the control system and is delayed by a time at least equal to the time necessary for detecting the open or closed state of the clutch, and
   the delayed signal is maintained between the clutch opening instant and the clutch closing instant, such that the computer simultaneously receives an instantaneous intention-related signal and a delayed signal maintained at a constant value and, after comparison, maintains a pressure setpoint at its maximum value during the clutch opening time.

8. A device for controlling operation of a vehicle powertrain, including a driving engine, a multi-speed manual gearbox and a clutch, the device comprising:
   a control system with a computer that determines a target power to be provided by the powertrain as a function of information displayed on a display screen of the computer corresponding to an intention of a driver,
   wherein the information relating to the intention of the driver is maintained on the display screen in response to a release of the vehicle accelerator for declutching during a change of gear ratio, such that the control system does not display and process inaccurate information obtained between a clutch opening instant and a clutch closing instant, when determining the target power to be provided.

* * * * *